United States Patent
Clemens et al.

(10) Patent No.: US 6,695,282 B2
(45) Date of Patent: Feb. 24, 2004

(54) POSITIONER FOR A VALVE THAT CAN BE ACTUATED BY A DRIVE

(75) Inventors: Wolfgang Clemens, Puschendorf (DE); Klaus-Dieter Fiebelkorn, Minfeld (DE); Gerhard Klebert, Bad Herrenalb (DE); Klaus Ludwig, Weissenburg (DE); Andre-Heinrich Meinhof, Rheinstetten (DE); Holger Schmaedicke, Landau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/263,676

(22) Filed: Oct. 4, 2002

(65) Prior Publication Data

US 2003/0136929 A1 Jul. 24, 2003

Related U.S. Application Data

(63) Continuation of application No. PCT/DE01/01283, filed on Apr. 2, 2001.

(30) Foreign Application Priority Data

Apr. 4, 2000 (DE) .......................................... 100 16 636

(51) Int. Cl.⁷ .............................................. F16K 37/00
(52) U.S. Cl. .............................. 251/129.04; 251/129.01
(58) Field of Search ........................ 251/129.01–129.22

(56) References Cited

U.S. PATENT DOCUMENTS

| | | | |
|---|---|---|---|
| 3,602,254 A | 8/1971 | Fawkes | |
| 4,199,981 A | * 4/1980 | Young | ..................... 23/204.19 |
| 4,500,867 A | 2/1985 | Ishitobi et al. | |
| 4,827,218 A | 5/1989 | Meunier et al. | |
| 4,924,696 A | 5/1990 | Schroeder et al. | |
| 5,704,586 A | * 1/1998 | Nielsen | .................. 251/129.04 |
| 5,711,342 A | * 1/1998 | Kazama et al. | ......... 251/129.08 |
| 5,929,631 A | 7/1999 | Striker et al. | |

FOREIGN PATENT DOCUMENTS

| | | |
|---|---|---|
| DE | 37 38 151 A1 | 5/1988 |
| DE | 42 32 950 A1 | 4/1994 |
| DE | 196 12 422 A1 | 10/1997 |
| DE | 196 23 742 A1 | 12/1997 |
| DE | 197 06 106 A1 | 8/1998 |
| EP | 0 637 713 A1 | 2/1995 |
| EP | 0 680 614 B1 | 11/1995 |
| EP | 0 729 562 B1 | 9/1996 |
| EP | 0 881 468 A1 | 12/1998 |
| JP | 8-285511 | 11/1996 |
| WO | WO 00/28282 A1 | 5/2000 |
| WO | WO 01/14750 A2 | 3/2001 |

* cited by examiner

*Primary Examiner*—Paul J. Hirsch
(74) *Attorney, Agent, or Firm*—Sughrue Mion, PLLC

(57) ABSTRACT

A positioner for a valve that is actuated by means of a drive. The positioner includes a locator (9) and a control unit (13). The locator (9) detects the actual position of an actuator (7). The control unit (13) compares the actual position with a predefined desired position, and generates an actuating signal. A magnet (18) having a magnetoresistive sensor, preferably a GMR sensor, is provided as the locator. The locator (9) is less susceptible to dirt and less prone to wear and tear than a conventional slide potentiometer. The positioner is thus less fault-prone.

8 Claims, 4 Drawing Sheets

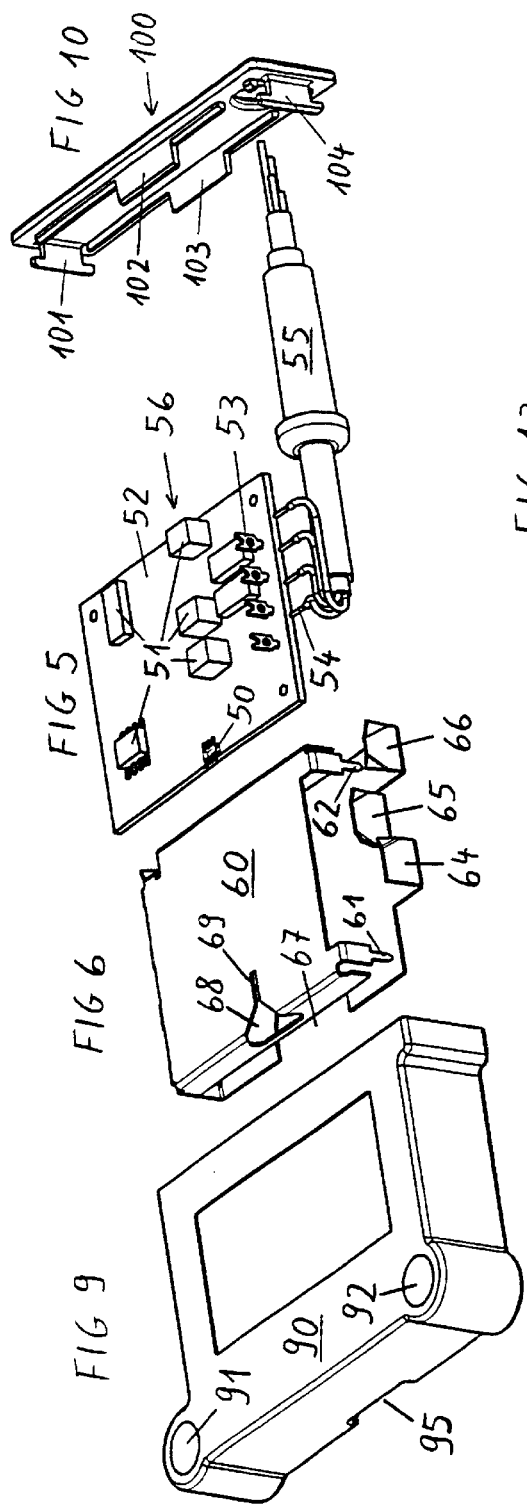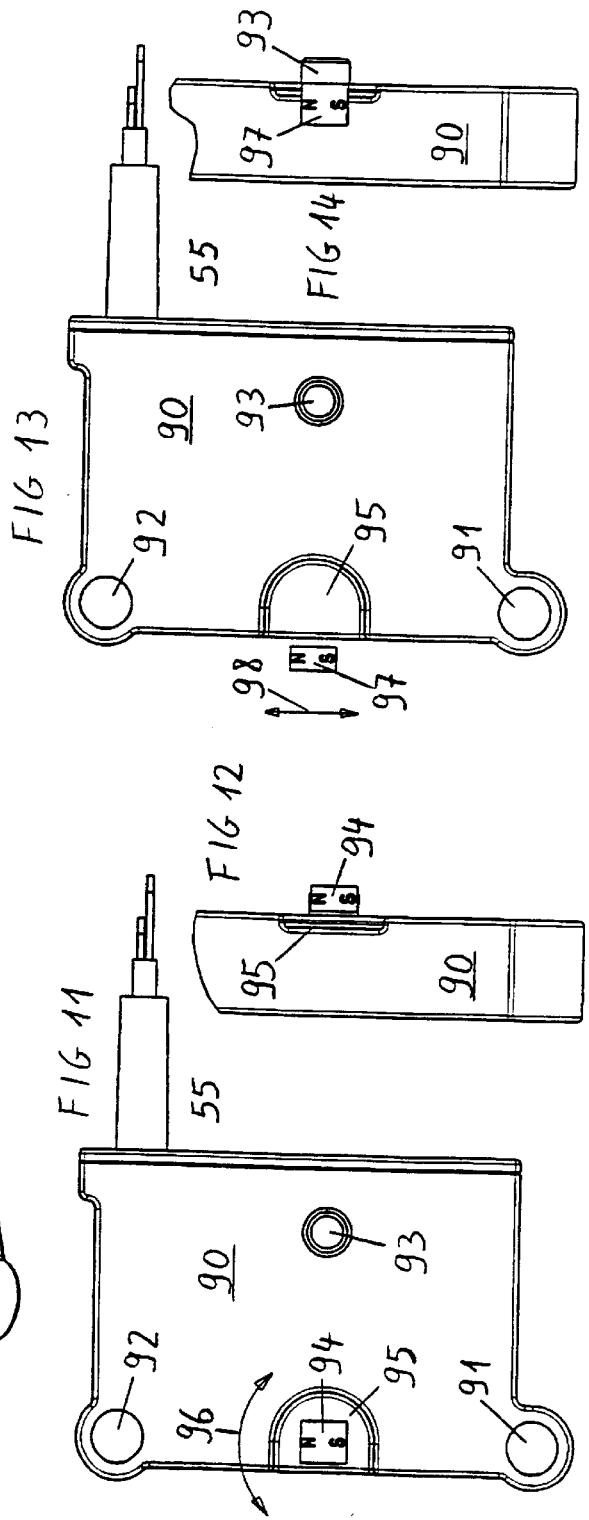

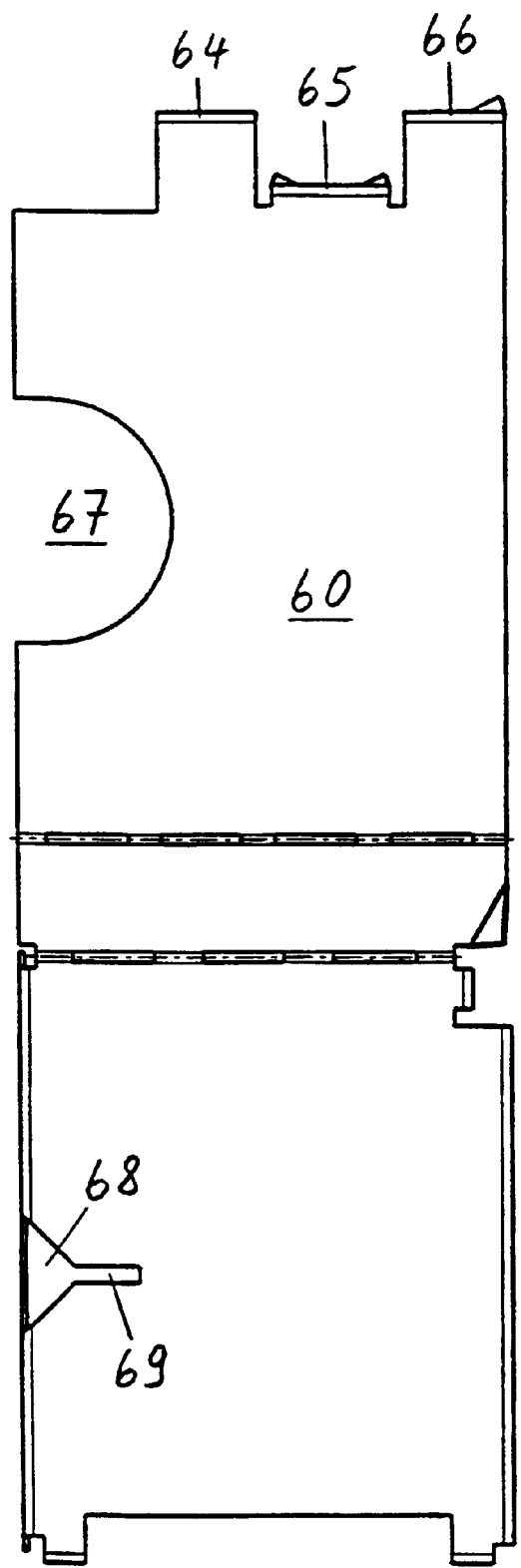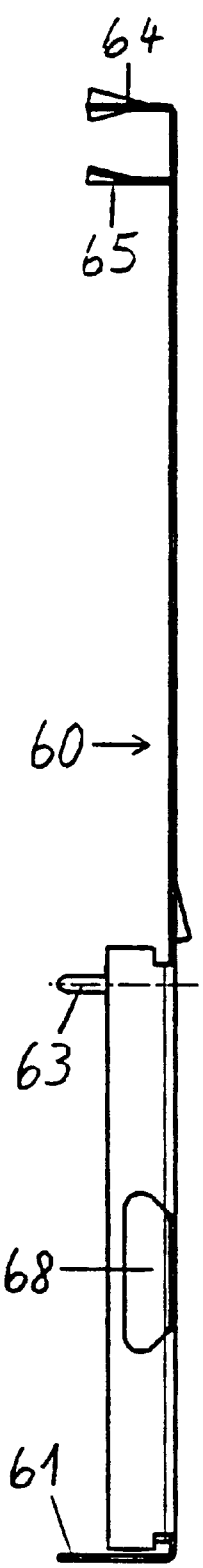

POSITIONER FOR A VALVE THAT CAN BE ACTUATED BY A DRIVE

This is a Continuation of International Application PCT/DE01/01283, with an international filing date of Apr. 2, 2001, which was published under PCT Article 21(2) in German, and the disclosure of which is incorporated into this application by reference.

FIELD OF AND BACKGROUND OF THE INVENTION

The invention relates to a positioner, especially for a valve that can be actuated by a drive.

European Publication EP 0 637 713 A1 discloses such a positioner for a valve that is actuated by a drive. The valve is installed in a pipe and controls the passage of a medium by way of a corresponding stroke of a closing element that interacts with a valve seat. A pneumatic drive is connected, by a push rod, with the closing element. A lever engages with the push rod and acts on a potentiometer, which functions as a locator of the positioner. The potentiometer detects the actual position of the actuator. A control unit of the positioner compares this actual position with a predefined desired position. As a function of the determined deviation, the control unit generates an actuating signal to control the pneumatic drive. The desired value is predefined for the positioner through a normalized signal, e.g., a 4 to 20 mA interface or a digital field bus message. Thus, the role of the positioner is to convert the predefined desired value of the actuator position into a pneumatic pressure signal that is supplied to the pneumatic drive and results in a corresponding position of the push rod.

In addition, flap valves are known in the art in which the opening angle of a rotary valve is detected by means of a rotary potentiometer. In this case, a positioner generates an actuating signal for a rotary actuator that controls the rotary valve.

Slide potentiometers, because of their simple and inexpensive construction, are frequently used for position detection. Their advantage is that they produce a usable electrical actuating signal in a relatively simple manner with low power consumption. For instance, a 10 kΩ potentiometer operated at 3 V consumes a maximum of 300 μA. The stroke or rotary movement of the actuator is applied to the potentiometer's axis of movement via corresponding add-on parts, e.g., a rotary lever with a switchable gear drive, and the component voltage detected by the potentiometer is transmitted to the analog input of an analog or digital control unit. The detection range of the angle of rotation for rotary actuators is typically 120° maximum. For linear actuators, typically the detection range is 15 mm maximum. The linear motion can also be converted into an angle of rotation of 120° maximum by means of a conversion mechanism.

In many areas of process and power technology, the fault-free operation of a plant depends on the flawless functioning of the control valves used. Downtimes of plants or plant parts caused by component failures significantly reduce the production capacity and the possible utilization of the plant. Thus, reducing downtimes and increasing system reliability are essential goals for efficient plant operation.

Due to their construction, the electromechanical slide potentiometers, which are frequently used for rotary or linear position detection, have drawbacks regarding their long-term stability because of wear and oxidation of the contact paths as well as because of their vibration fatigue limit. After prolonged quasi-static operation, their sliders tend to stick. Due to mechanical wear, the sliders and the resistive coatings eventually wear or their quality changes as a result of aging and oxidation. In electromechanical slide potentiometers, the rotary or linear motion is transmitted by means of a continuous shaft. Suitable encapsulation against environmental influences is therefore very costly and in itself is susceptible to aging and wear.

European Patent EP 0 680 614 B1 discloses a device for detecting an angular position of an object. The sensors described in this patent specification are based on the giant magnetoresistive (GMR) effect and consist of alternating magnetically hard and magnetically soft metal layers. These layers are each only a few atoms thick and are sputtered onto a silicon substrate. The resistance of the sensors greatly depends on the direction of a magnetic field acting on them. A GMR sensor is thus very well suited to detect a change in the angular position of a magnet.

OBJECTS OF THE INVENTION

An object of the invention is to provide a positioner, particularly for a valve that is actuated by a drive, which is distinguished by its improved interference immunity while being inexpensive to produce.

SUMMARY OF THE INVENTION

To attain this and other objects, according to the principles of the present invention and according to one formulation, the novel positioner, for a valve (2) that is actuated by a drive (6), includes: a locator (9) that detects the actual position of an actuator (7), and a control unit (13) that compares the actual position with a predefined desired position and generates an actuating signal. The locator includes a permanent magnet (18) and a sensor (50), and the magnet and sensor are rotatable or displaceable relative to one another in conjunction with a movement of the actuator (7). Further, the sensor (50) is arranged in an area of a housing (90) such that the sensor (50) is positioned to detect a relative rotation between the sensor and the magnet when the magnet rotates about an axis of rotation, and is positioned to detect a relative shift between the sensor and the magnet when the magnet is displaced, wherein the shift occurs in a plane that extends substantially perpendicularly to the axis of rotation.

The invention obviates the drawbacks of conventional potentiometers, since it uses a contactless potentiometer that includes a magnet and a magnetoresistive sensor. The novel locator provides the exact actual position of the actuator in either a dynamic or a static case. A non-linearity of the locator's output signal, which is minor in any case, is readily compensated. Between the magnet and the magnetoresistive sensor, a partition can easily be installed for encapsulation and, thus, protection against environmental influences. Therefore, the locator is very rugged and insensitive to dirt and a harsh environment. The magnet is easily mounted outside the sensor housing on a linear or rotary actuator such that its magnetic field lines act on the magnetoresistive sensor through the housing wall. An evaluation circuit is readily integrated in the sensor housing. This evaluation circuit generates a voltage proportional to the angle of rotation, or the linear path, of the magnet by way of the change in resistance of the magnetoresistive sensor. Thus, the evaluation circuit supplies, to a control unit, a signal that corresponds to the actual position and is immune to interference.

A minimum distance between the magnet and the sensor is easily kept to prevent damage to the magnetically hard layers, especially in a GMR sensor, since in this sensor type the strength of the magnetic field may not exceed 15 kA/m. The contactless principle of the novel locator eliminates the problem of a scratching or sticking slide potentiometer. This contactless principle offers advantages in applications where the potentiometer is exposed to continuous vibrations. It is also advantageous in the quasi-static case where the potentiometer position remains unchanged over a long period of time, and where there is a risk that the slider of a slide potentiometer would dig into the resistance layer and possibly get stuck there due to control instability in the system. If the magnet forms the moving part of the locator, which is coupled with the actuator, it couples the actuating movement into the magnetoresistive sensor through its magnetic field, without requiring any mechanical duct. By corresponding add-on parts, an exact rotary or linear motion of the moving part is ensured in a simple manner.

If the magnet is designed as a permanent magnet, a particularly simple structure results, since the magnet does not require a power supply, and thus does not increase the current consumption of the locator.

An advantageous clear increase in the resistance of the magnetoresistive sensor results if a so-called anisotropic magnetoresistive sensor is used. When the magnetization of the layer is rotated relative to the current direction of a measuring current flowing through the layer of the sensor, there is a change in the resistance in this type of sensor, which can be a few percentage points of the normal isotropic resistance. This ensures a sufficiently high signal-to-noise ratio of the measurement signal.

Using a so-called giant magnetoresistive (GMR) sensor has the advantage that the change in the resistance is independent of the field strength within a wide range, and is only sensitive to the direction of the magnetic field. This directional dependence of the resistance resembles a cosine function, and is therefore nearly linear within a wide range.

Advantageously, the same sensor construction can be used for installation, in both rotary actuators and linear actuators, without requiring any structural changes. For this purpose, the GMR sensor is arranged in the area of the edge of a housing in such a way that the same sensor is positioned to detect a relative rotational movement at least approximately on the axis of rotation of a magnet that is provided for this case, and to detect a relative shift jointly with a magnet that is provided for this case in a plane that extends substantially perpendicularly to the aforementioned axis of rotation. The distance between the sensor and the housing wall facing the magnet is preferably about 5 mm. This ensures that the required minimum distance between magnet and sensor is met. Since the sensor can be used in both rotary and linear actuators, the costs of logistics and warehousing are reduced because only one GMR sensor type is required.

Improved measurement accuracy in case of temperature fluctuations is obtained by arranging a temperature compensation circuit in the housing of the GMR sensor. To obtain particularly good temperature compensation, the bridge resistance of the GMR sensor is simultaneously used as a measurable resistance for the temperature compensation circuit. This completely eliminates problems of thermal coupling between the measuring resistor and the GMR sensor.

Advantageously, the GMR sensor is arranged on one side and the temperature compensation circuit is on the other side of the same printed circuit board. As a result, the components of the temperature compensation circuit, the housing of which is typically larger than the component housing of the GMR sensor, do not need to be arranged between the GMR sensor and the exterior of the locator housing that faces the magnet. Therefore, the components of the temperature compensation circuit do not influence the spacing between the GMR sensor and the exterior of the locator housing. This makes it possible to keep a small distance between the upper edge of the component housing of the GMR sensor and the locator-housing exterior.

Precise positioning of the magnet relative to the GMR sensor can easily be achieved by providing a centering aid on the housing of the GMR sensor to adjust the relative position of the magnet in relation to the sensor during installation. This positioning aid is configured as a molded part that is placed on the magnet, removed again after installation, and that is inserted into an opening on the housing of the GMR sensor in a positive fit during installation. After the magnet and the GMR sensor have been attached, the molded part is removed.

A mechanically positive-locking configuration of the moving part and the sensor housing ensures the spatially correct positioning of the magnet and the sensor. The connections of the two parts to form a complete locator can be non-positive, i.e., wireless. Alternatively, the locator can be constructed as a complete, mechanically integral, locator block, which comprises the moving part with magnet, GMR sensor and evaluation electronics. Such a locator ensures a defined distance between the magnet and the GMR sensor. In principle, active evaluation electronics that are completely isolated from the moving part, both mechanically and electrically, make possible robust and interference-free locator electronics in miniature form that are screened in a simple manner against electrical as well as magnetic interference. The magnet itself requires no mechanical duct through a partition to the housing of the GMR sensor and is located together with the GMR sensor in a common screened chamber for protection against electrostatic and electromagnetic interference. For applications in areas that are subject to extreme interference, a corresponding external screen, which also encloses the magnet, can be constructed as an add-on component if required.

To prevent the control unit from being exposed to possibly high temperatures that may prevail in the locator, the control unit is advantageously arranged in a second housing separate from the GMR sensor housing. In this case, the locator and the control unit are interconnected by a medium for transmitting the actual position of the actuator, e.g., by an electric cable. The linear or rotary movement is detected directly by the locator in a sensor housing, which is attached on the drive or the actuator by a corresponding adapter kit. The sensor housing can also be formed by the housing of a positioner, in which only the circuit parts of the locator are arranged for separate construction. The control unit of the positioner is installed at some distance, e.g., on an installation pipe or a similar installation aid, and is connected with the locator by an electric cable and with the pneumatic drive by one or two pneumatic lines. It is useful to accommodate the locator and the control unit in separate housings, particularly if the environmental conditions around the actuator exceed the values specified for the control unit. This may be the case, for instance, if the temperatures on the valve or the drive are high because of a hot medium flowing the valve, or if the valve or the drive is subject to strong oscillations or vibrations, or if there is little room available on the valve or the drive to mount the entire positioner.

Other advantages of the novel positioner include its: suitability in areas subject to explosion hazards due to its low power requirements and readily integratable protective circuits; wide supply voltage tolerances; minimized external interference through integrated screens and EMI filters; minimized temperature influences with low supply current; minimized and stably reproducible hysteresis as a function of the angle of rotation between magnet and GMR sensor; and field strength.

The minor hysteresis fluctuations and the minor non-linearity, resulting from manufacturing tolerances of the GMR sensors, are irrelevant for the application as a locator in a positioner. If the positioner is intended to output the actual position, as information to additional components of a system, the output signal is easily corrected and actively filtered corresponding to the known linearity and hysteresis characteristics of the individual GMR sensor. For this purpose, if required, the specific correction data of the GMR sensor is stored in a microcontroller of the positioner. For simplified correction of linearity and hysteresis errors, it is sufficient to determine and store five basic sensor-specific characteristic values, which are recorded under standard conditions. These basic values are located, for instance, at the points of the maximum change in the slope of the curves. For a more precise correction, all the characteristic curves are stored with the desired resolution in a serially readable memory medium supplied with the GMR sensor and assigned to the GMR sensor by an identification key. The content of the memory medium is loaded, for instance, into the microcontroller upon installation of the GMR sensor.

BRIEF DESCRIPTION OF THE DRAWINGS

The invention, as well as embodiments and advantages thereof, will now be described with reference to exemplary embodiments depicted in the drawings, in which:

FIG. 5 shows a printed circuit module with the circuits depicted in FIGS. 3 and 4;

FIG. 6 shows a metallic screen for the printed circuit module according to FIG. 5;

FIG. 7 is a top view of an open metallic screen;

FIG. 8 is a side view of an open metallic screen;

FIG. 9 is a housing for a GMR sensor;

FIG. 10 is a sealing cover for the housing depicted in FIG. 9;

FIG. 11 is a bottom view of an angular position sensor;

FIG. 12 is a side view of the angular position sensor according to FIG. 11;

FIG. 13 is a bottom view of a linear position sensor; and

FIG. 14 is a side view of the linear position sensor according to FIG. 13.

DETAILED DESCRIPTION OF THE PREFERRED EMBODIMENTS

Figure 1:
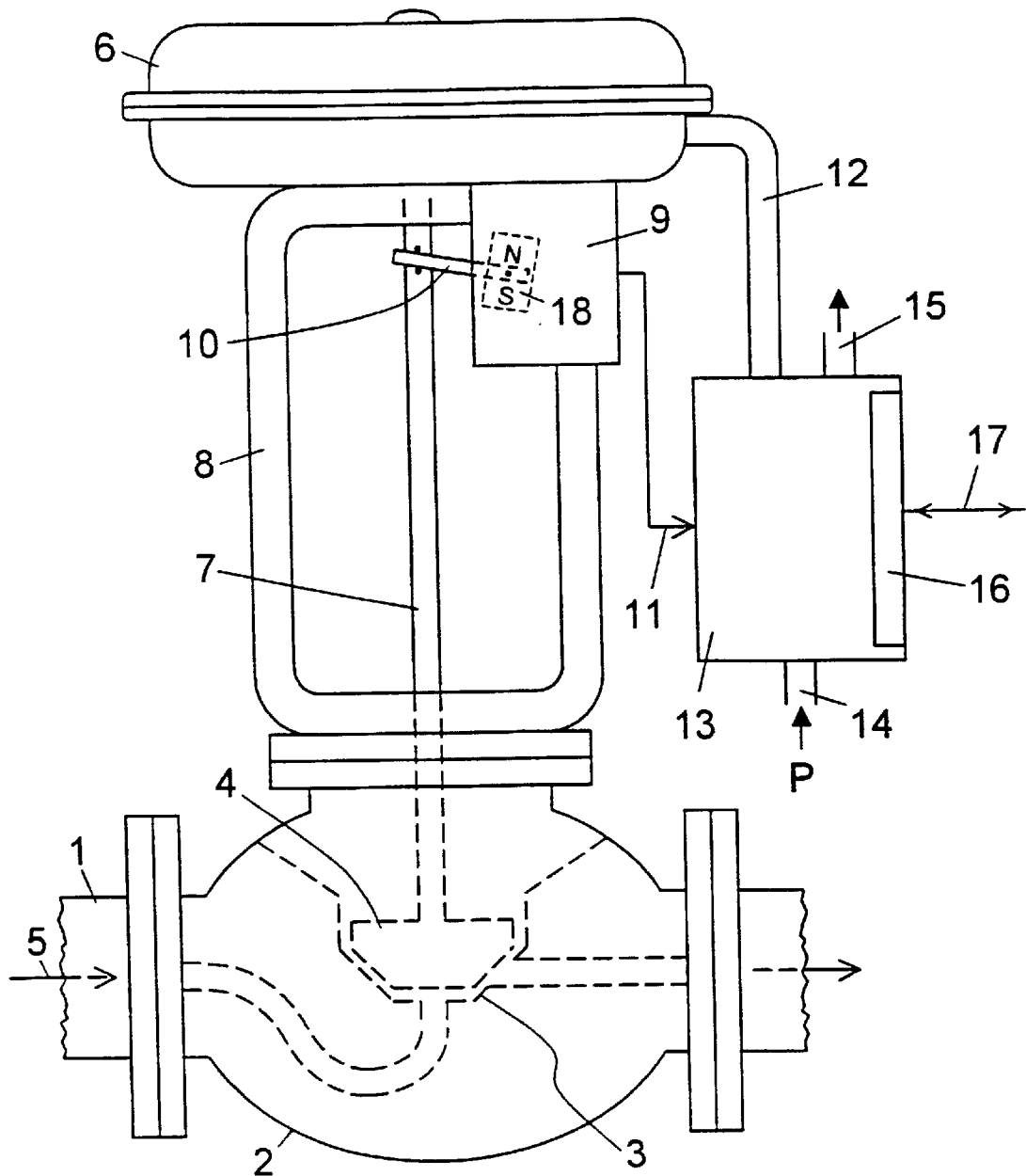
FIG. 1 shows a control valve.

FIG. 1 shows a valve 2 that is installed in a pipe 1 of a process technology plant (not depicted) and controls the flow rate of a medium 5 by a corresponding stroke of a closing element 4 that interacts with a valve seat 3. The stroke is produced by a pneumatic drive 6 and is transmitted by a valve rod 7 to closing element 4. Drive 6 is connected with the housing of valve 2 by a yoke 8. A locator 9 is mounted on yoke 8 and on the input side detects the stroke of valve rod 7 by way of a connecting element 10 guided on valve rod 7. The locator 9 generates an analog output signal 11 that corresponds to the stroke. The pneumatic drive 6 comprises a substantially horizontal membrane, which separates an upper from a lower chamber. The lower chamber is connected, via a pipe 12, with a control unit 13. The control unit 13 is accommodated in a housing that is separate from the housing of locator 9. A spring is arranged in the upper chamber, which acts against the pressure of the lower chamber. In the absence of pressure, the spring closes valve 2.

Through valves controlled in control unit 13, inlet air that is supplied through a line 14 is introduced at a pressure P into the lower chamber via pipe 12, or is released as exhaust air into the environment via a line 15. Control unit 13 compares the actual position of valve rod 7 (which is described as an actuator in control system terms), which it receives by signal 11, with a desired value supplied by a field bus 17 via a data interface 16. The control unit 13 can then correct any deviation by correspondingly adjusting the air stream in pipe 12.

The connecting element 10 is embodied as a lever arm that is guided between two pins mounted on valve rod 7. Thus, the connecting element follows the stroke movements of valve rod 7. A magnet 18, fixed to connecting element 10, is rotatably supported in the housing of locator 9, which also contains a GMR sensor. Through movement of connecting element 10, the magnet 18 is set into a rotary motion corresponding to the stroke of valve rod 7. While locator 9 is fixed to yoke 8, and may consequently be exposed to high ambient temperatures, control unit 13 is mounted at a distance therefrom in a less harsh environment, e.g., on an installation pipe (not depicted in FIG. 1). This expands the scope of application of the positioner, which typically comprises sensitive valves for pneumatic control.

Figure 2:
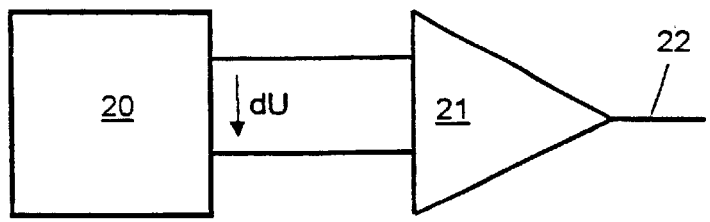
FIG. 2 is a block diagram of a locator.

FIG. 2 depicts a circuit diagram of an evaluation circuit with a GMR sensor, which is integrated in locator 9 (FIG. 1). In principle, the evaluation circuit—for measuring a change in the resistance of the GMR sensor, which depends on the direction of the magnetic field—comprises a circuit 20 for supplying the measuring bridge and compensates for a change in temperature. The evaluation circuit further comprises a circuit 21 for signal conditioning with offset formation and amplification of a bridge output signal dU, which is supplied by circuit 20. Circuit 21 generates an output signal 22, e.g., with a range of values from 0.1 to 2.5 V, which represents the actual position of the actuator. The output signal 22 corresponds to signal 11 in FIG. 1. Additional circuit elements, which are not depicted in FIG. 2, comprise, for example, EMI filters and redundant electronic current and voltage limiting devices that are located in the connecting branches of the circuit and are used for interference immunity and to avoid impermissible operating states with respect to explosion protection. The entire evaluation circuit is distinguished by its very low power consumption, which is less than 300 $\mu A$.

Figure 3:
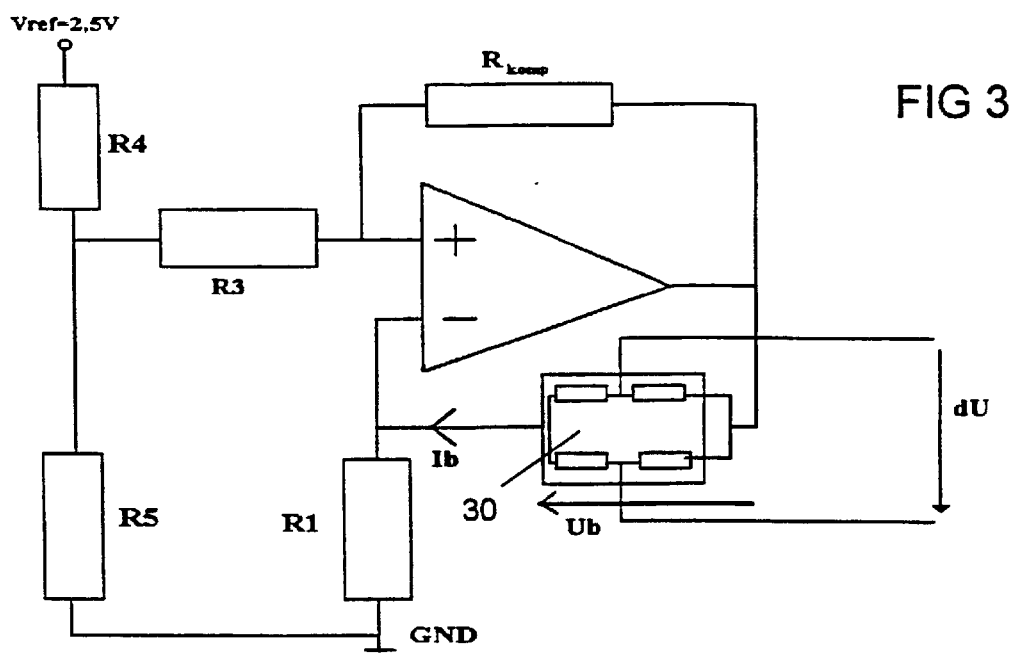
FIG. 3 shows a circuit for temperature compensation.

FIG. 3 is a more detailed diagram of circuit 20 (FIG. 2), which is used for temperature compensation and for operating a GMR sensor 30. The GMR effect is temperature dependant. The bridge output voltage dU can be approximated by the following formula:

$$dU(\alpha, T) = \frac{1}{2} \cdot \frac{\Delta R}{R}(T_0) \cdot [1 + Tk_{\Delta R/Ro\_lin} \cdot (T - T_0) + Tk_{\Delta R/Ro\_Q} - (T - T_0)^2] \cdot U_b(T) \cdot \cos(\alpha) + U_{off} dU(T) \sim u_B[f(T)]$$

where

α is the angle included between the direction of the magnetic field and the GMR sensor,
T is the temperature of GMR sensor 30,
$T_0$ is 20° C.,
$R_0$ is the resistance at 20° C.
$Tk_{\Delta R/Ro\_lin}$ and $Tk_{\Delta R/Ro\_Q}$ are the compensation parameters and
$U_{off}$ is an offset voltage.

To counteract a drop, due to temperature, in the bridge output voltage dU of GMR sensor 30, a supply voltage Ub of the bridge is increased accordingly. This function is implemented by the circuit depicted in FIG. 3. Without a resistance $R_{komp}$, the circuit would represent a constant current source for a current Ib whose value is adjusted by a resistor R1 and the voltage on a voltage divider, wherein the voltage divider is formed by resistors R4 and R5 as well as R3. The voltage divider is supplied with a voltage $V_{ref}$=2.5 V. The resistance of the GMR sensor bridge $R_{sen}$ increases with the temperature. However, the voltage dU at the bridge output, which changes with the direction of the magnetic field, drops by about twice that amount. As a consequence, the voltage increase through the constant current source is not sufficient to keep constant the amplitude of the bridge output voltage dU independent of the temperature. The voltage increase is therefore adjusted by a positive feedback with resistance $R_{komp}$ such that it compensates the reduction of the sensor effect on the sensor bridge. The bridge resistance of the GMR sensor 30 itself serves as a temperature sensor. For optimal temperature compensation, $R_{komp}$ is determined by:

$$R_{komp} = \frac{R_{sen}(T_0) \cdot (R_3 R_4 + R_3 R_5 + R_4 R_5)}{R_1 (R_4 + R_5)} \cdot \frac{1}{\left(\frac{1}{C} - \frac{1}{D}\right)} \cdot$$

$$\cdot \left( \frac{1}{[1 - 50 Tk_{\Delta R/Ro\_lin} + 2500 Tk_{\Delta R/Ro\_Q}]} - \frac{1}{[1 + 60 Tk_{\Delta R/Ro\_lin} + 3600 Tk_{\Delta R/Ro\_Q}]} \right)$$

where $$C = [1 - 50 Tk_{\Delta R/Ro\_lin} + 2500 Tk_{\Delta R/Ro\_Q}][1 - 50 Tk_{Rsen\_lin} + 2500 Tk_{Rsen\_Q}]$$

and $$D = [1 + 60 Tk_{\Delta R/Ro\_lin} + 3600 Tk_{\Delta R/Ro\_Q}][1 + 60 Tk_{Rsen\_lin} + 3600 Tk_{Rsen\_Q}]$$

If the values of resistors R1, R3, R4 and R5 are suitably selected, this circuit is distinguished by particularly low current consumption with good accuracy of the temperature compensation.

Figure 4:
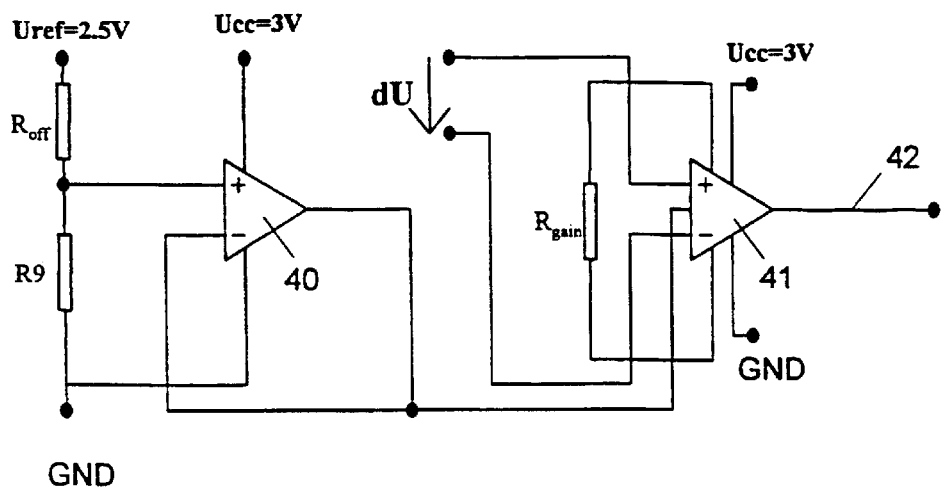
FIG. 4 shows a circuit for amplification and offset adjustment.

The output signal dU of the GMR sensor 30 (FIG. 3) is adjusted by means of the circuit shown in FIG. 4 with respect to its amplification and its offset adjustment. An operational amplifier 40, together with a voltage divider is used to adjust the amplification. The operational amplifier 40 is operated with a supply voltage Ucc=3 V. The voltage divider includes resistors $R_{off}$ and R9, to which a reference voltage Uref=2.5 V is applied. The output voltage obtained at the output of the operational amplifier 40 is supplied to a difference amplifier 41, which is used to adjust the amplification. This difference amplifier 41 is also operated at a supply voltage Ucc=3 V. In this manner, the differential signal dU is amplified from approximately 3 mV to 1.2 V and is boosted to an average potential of 1.3 V. An output signal 42 corresponding to signal 11 in FIG. 1, has a range of values from 0.1 to 2.5 V. An amplifier resistance $R_{gain}$ is selected in such a way that the range of values of the output signal dU of the GMR sensor 30 (FIG. 3) is mapped to the range of values of the output signal 42. This circuit is also distinguished by its particularly low current consumption. This is important especially if the locator is used in combination with a field bus, which is used to transmit both the energy required to operate the circuit components and the information signals. Even if a 4 to 20 mA interface is used for the positioner, low current consumption of the circuit components is particularly important, because the positioner must be able to manage with an operating current of only approximately 4 mA.

FIG. 5 shows one possible spatial arrangement of a GMR sensor 50 and an evaluation circuit on a printed circuit board 52. The GMR sensor 50 is arranged on the bottom side of the printed circuit board 52 (illustrated as transparent here for better clarity) while components 51 of the evaluation circuit are mounted on the topside. As a result, the higher components 51 of the evaluation circuit do not need to be taken into account when determining the distance between the upper edge of the GMR sensor 50 and the housing exterior. Along the front edge of printed circuit board 52, four solder lugs 53 are provided to which cable ends 54 of a cable 55 are soldered. Two wires of the cable serve to output the output signal (11 in FIG. 1), whereas the other two wires are connected to the electronic circuit components of the locator.

As an alternative to the described embodiment with a GMR sensor 50, the sensor can be configured as a so-called anisotropic magnetoresistive sensor. The circuit principle of the evaluation circuit remains unaffected.

The equipped printed circuit board 56 is inserted into a metal screen 60, which is shown closed in FIG. 6 and open in FIGS. 7 and 8.

Like components in the figures are provided with like reference numerals. For the correct positioning of printed circuit board 56, three solder pins 61, 62 and 63 are provided, which project into corresponding holes of printed circuit board 52 where they are soldered for assembly. After the printed circuit board 52 has been soldered, the metal screen is folded and cable 55 is placed into clamping lugs 64, 65 and 66 where it is held in place by clamping force.

In the areas where the GMR sensor 50 comes to rest, a substantially semicircular opening 67 is provided in the metal screen 60 so that a magnetic field can penetrate metal screen 60 and reach GMR sensor 50. An opening 68 serves for exact positioning of metal screen 60 in a housing 90, which is illustrated in FIG. 9. During insertion into housing 90, opening 68 is pushed onto a rib, which in FIG. 9 is covered up by the topside of the housing. After centering, this rib fits into a groove 69 of opening 68.

Housing 90 of GMR sensor 50 is made, for example, of a plastic material or a non-ferromagnetic material, which protects the printed circuit board 56 against environmental influences. At the same time, housing 90 provides means for fastening the locator at the site. For simple fastening on standard mounting kits, housing 90 is provided with two location holes 91 and 92 for screws and with a positioning pin 93. The positioning pin 93 is covered up in FIG. 9 and is visible only in FIGS. 11 and 13, which show the housing from below. This manner of fastening makes it possible, in any case, to realize a stable alignment of the locator to the actuator.

After metal screen 60, equipped with printed circuit board 56, has been folded and inserted into housing 90, the housing is sealed by a cover 100 depicted in FIG. 10. The cover 100 is provided with guide brackets 101 to 104, which correspond to the inner sides of the housing.

The metal screen 60 is arranged between printed circuit board 56 and housing 90 for reasons of electromagnetic compatibility, i.e., to prevent electromagnetic interference with the evaluation circuit and to prevent the emission of electromagnetic waves. As an alternative to the exemplary embodiment shown, an electromagnetic screen is obtained by metallizing a plastic housing, or by using metal fiber-reinforced plastic. To prevent impairment of the functioning of the GMR sensor, however, the material used may not have any ferromagnetic properties in the area of the GMR sensor.

Printed circuit board 56, to improve protection and to make it suitable for use in areas subject to explosion hazards, may be encapsulated with an insulating filler in housing 90.

The four-core cable 55, for connecting the locator with the control unit, can also be single or double-shielded, depending on the application. The cable shield can easily be electrically connected with printed circuit board 56 and/or the metallic screen 60.

FIGS. 11 to 14 illustrate the spatial arrangement of a magnet relative to housing 90.

To detect angles of rotation, a magnet 94 is approximately centered under a substantially semi-circular opening 95 in housing 90. This opening 95 is a centering aid for adjusting the relative position of magnet 94 in relation to GMR sensor 50, which is located in housing 90. For this purpose, a positive locking positioning tool, which receives magnet 94, is inserted into opening 95. After the magnet has been firmly fixed to a moving part (not depicted in FIGS. 11 and 12), magnet 94 is centered and the positioning tool is removed. The axis of rotation of magnet 94 extends perpendicularly to the drawing plane in FIG. 11. The rotatability of magnet 94 is indicated by arrow 96. In FIG. 12, the axis of rotation extends through the center of magnet 94 in a horizontal direction.

FIGS. 13 and 14 illustrate the arrangement of a magnet 97 for detecting linear movements. This is indicated by a displacement arrow 98. In this case, magnet 97 together with GMR sensor 50, which is arranged in housing 90, is located in a plane that is substantially perpendicular to the above-described axis of rotation and parallel to the drawing plane of FIG. 13. A positioning tool, with a positive fit relative to opening 95 and magnet 97, is again used for exact positioning of the magnet.

The selected arrangement of GMR sensor 50 in its housing 90 makes it possible to use the same GMR sensor for detecting both angles of rotation and linear motions without requiring any structural changes in its housing. Magnets 94 and 97 are held in a plastic component (not depicted in the figures) and are encapsulated to protect them from environmental influences. The guidance of magnets 94 and 97 in a moving part (not depicted in the drawings) is structurally adapted to the corresponding installation conditions, so that the rotary or linear motion of an actuator is converted into a corresponding rotary or linear motion of the magnets 94 or 97.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A positioner, for a valve that is actuated by a drive, comprising:
   a locator that detects the actual position of an actuator, and
   a control unit that compares the actual position with a predefined desired position and generates an actuating signal,
   wherein said locator comprises a permanent magnet and a sensor, and wherein said magnet and sensor are rotatable or displaceable relative to one another in conjunction with a movement of said actuator, and
   further wherein said sensor is arranged in an area of a housing such that said sensor is positioned to detect a relative rotation between said sensor and said magnet when said magnet rotates about an axis of rotation, and is positioned to detect a relative shift between said sensor and said magnet when said magnet is displaceable, wherein said shift occurs in a plane that extends substantially perpendicularly to said axis of rotation.

2. The positioner as claimed in claim 1, further comprising a temperature compensation circuit arranged in said housing of said sensor.

3. The positioner as claimed in claim 2, wherein a bridge resistance of said sensor provides a measurable resistance for said temperature compensation circuit.

4. The positioner as claimed in claim 2, further comprising a printed circuit board, wherein said sensor is arranged on a bottom side, and said temperature compensation circuit is arranged on a topside, of said printed circuit board.

5. The positioner as claimed in claim 1, further comprising a centering aid arranged on said housing of said sensor, wherein said centering aid is capable of adjusting the relative position of said magnet in relation to said sensor during installation.

6. The positioner as claimed in claim 1, wherein said control unit is arranged in a second housing that is separate from said housing of said sensor.

7. The positioner as claimed in claim 1, wherein said sensor is a GMR sensor.

8. The positioner as claimed in claim 1, wherein said sensor is an anisotropic magnetoresistive sensor.

* * * * *